Sept. 22, 1959   J. NOALL   2,905,361
DEVICE AND METHOD FOR MEASURING AND DISPENSING FLUIDS
Filed Jan. 3, 1956   3 Sheets-Sheet 1

INVENTOR.
JOHN NOALL
BY
W. A. Fraser
ATTY-

United States Patent Office 2,905,361
Patented Sept. 22, 1959

2,905,361

DEVICE AND METHOD FOR MEASURING AND DISPENSING FLUIDS

John Noall, Cuyahoga Falls, Ohio, assignor to The Firestone Tire & Rubber Company, Akron, Ohio, a corporation of Ohio Application January 3, 1956, Serial No. 557,002

6 Claims. (Cl. 222—1)

This invention relates to a device having means for injecting viscous liquids into a closed container and more particularly to means for injection compounding oils into a closed mixer.

Conventional methods of adding softening oils to rubbery or plastic batches being mixed in a closed mixer such as a Banbury Mixer have not been accurate. Usually the oil is poured into a flask and measured volumetrically before it is repoured into the mixer through an opening in the mixer wall. This method is inaccurate because some oil is spilled and a dirty condition exists around the mixer. Other conventional methods also are unsatisfactory for various reasons.

The present invention provides means for the accurate addition of viscous oils to a rubbery batch being mixed in a closed mixer by use of an injection cylinder which is responsive through a remote control unit to the pulse output of an accurately timed electro-mechanical system.

It is therefore an object of the invention to provide means for accurately adding a known quantity of a liquid to a batch being mixed in a closed container. It is also an object of the invention to provide means for injecting liquids into a closed container in response to the accurately timed pulsations of an electro-mechanical system. Yet, a further object of the invention is to provide an oil dispensing cylinder adapted to inject known quantities of several different oils into a closed mixer. Another object of the invention is to provide a dispensing cylinder adapted to accurately measure quantities of several different oils in response to electrical pulsations received through a timing control unit from a mechanical-electric pulser.

These and other objects of the invention will be more clearly understood by reference to the following specification, claims and drawings of which:

Figure 1:
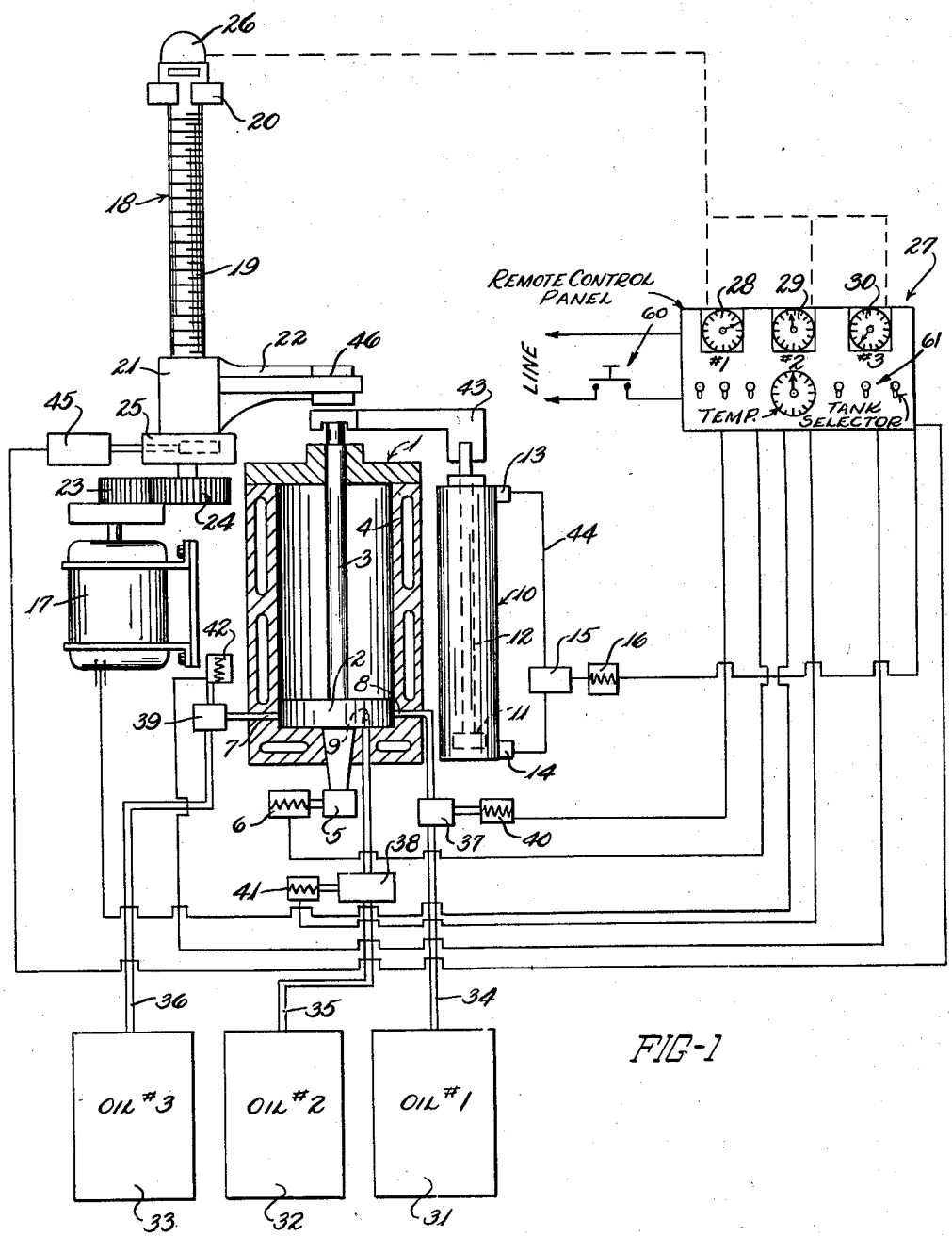
Figure 1 is a schematic diagram including a sectional view of the dispensing cylinder of the invention as it is associated with the other electrical and mechanical components thereof.

Referring to Figure 1, an oil dispensing cylinder generally indicated at 1 is defined by wall 4 surrounding piston 2 mounted on piston rod 3 which extends through suitable packing in the cap of the dispensing cylinder and is attached to air cylinder arm 43. Cylinder 1 is provided at one end thereof with oil inlets 7, 8 and 9 controlled by solenoid operated valves 39, 38 and 37 respectively. An outlet to the mixer is provided through valve 5 operated by solenoid 6.

A double acting air cylinder generally indicated at 10 is comprised of piston 11 mounted on piston rod 12 extending through the cap of the cylinder and attached to air cylinder arm 43. The walls of the air cylinder 10 are provided with air ports 13 and 14 connected as shown schematically by conduit 44 mounting air valve 15 actuated by solenoid 16. A metering screw assembly generally indicated at 18 is comprised of metering screw 19 mounting stop collar 20 at one end thereof. Metering nut 21, mounting arm 22 and stop nut 46 is adapted for reciprocating movement the length of metering screw 19 in response to rotation thereof.

Rotation of metering screw 19 is provided through motor 17 and the linkage of spur gears 23 and 24.

The rotation of metering screw 19 drives an impulse initiator 26 which may be an automobile distributor equipped with a 5 point cam which in turn is electrically linked with a remote control unit generally indicated at 27 on which are mounted 3 impulse reset counters having 1,000 count dials 28, 29 and 30, each capable of receiving a maximum of 500 impulses per minute. A typical example of such counters is described in U.S. Patents 1,794,762, 2,175,864, 2,175,865.

Oil for the system is contained in tanks 31, 32 and 33 each holding a different oil and linked to the inlet ports 8, 9 and 7 of the dispensing cylinder respectively through pipes 34, 35 and 36 each mounting valves 37, 38 and 39 respectively actuated by solenoids 40, 41 and 42.

The selection of the oils to be metered is done by manipulating the respective tank selector switches 61 in control unit 27. It is possible to selectively meter one, two, or all three oils in sequence by manipulating the corresponding switches 61. When a particular oil is to be omitted, its associated switch 61 is positioned to inactivate the corresponding impulse reset counter. The inactivated counter is, in effect, shorted out of the circuit, and the other counters function in sequence.

The quantity of oil to be metered is set by manipulating the dial of the corresponding impulse reset counter 28, 29, or 30. Each dial is set to the number of counts which is equivalent to the quantity of oil to be metered from its respective tank.

In operation of the device, motor 17 is started by the operator actuating push button 60 and through spur gears 23 and 24 drives metering screw 19 and thereby distributor 26 to send out pulses in proportion to the speed of rotation of screw 19. As screw 19 rotates, metering arm 22 retracts stop nut 46 to a position proportional to the volume of oil #1 to be forced into the cylinder.

After metering screw 19 has turned the distributor 26 a sufficient number of times to feed the predetermined number of impulses into the counter 28, motor 17 is stopped by the control unit 27 and stop nut 46 now is at the required distance from air cylinder arm 43. The control unit 27 now activates solenoid 16 and valve 15 to raise piston 11, piston rod 12 and arm 43 until stopped by stop nut 46. This action raises piston rod 3 and piston 2 and brings these elements to a new position which with the walls of the cylinder accurately defines the volume to be filled by oil #1.

Valves 38 and 39 are closed and valve 37 is open by the control unit 27 to permit the oil from tank 1 to rush into and fill the available volume in dispensing cylinder 1. The impulse output of distributor 26 is counted by the dial 28 and associated electrical circuit in the remote control unit 27. Next, the electrical system in the control unit 27 actuates solenoid 40 to close valve 37 at the same time actuating motor 17 to rotate screw 19 driving stop nut 46 to a new position proportional to the volume of oil #2 to be added as determined by the number of impulses put out by distributor 26 and counted by counter 29 in the control unit 27. When the predetermined number of impulses have been counted as set on dial 29, the motor 17 is stopped and the air cylinder 10 is again driven through solenoid 16 and valve 15 to raise the piston rod 3 and piston 2 of the oil dispensing unit until the air cylinder arm 43 contacts stop nut 46.

and piston 2 defines in the cylinder the desired volume for oil #2. At the same time, valve 38 is opened and oil from tank 32 flows in to fill this desired predetermined volume.

Valve 38 next is closed and motor 17 is again actuated by control unit 27 to move arm 22 and stop nut 46 up screw 19 until sufficient impulses from distributor 26 as set in dial 30 are counted by control unit 27. Stop nut 46 then is stopped and cylinder 10 is again activated through solenoid 16 and valve 15 to raise piston rod 12 and piston 11 and thereby arm 43, piston rod 3 and piston 2 until arm 43 abuts stop nut 46. Piston 2 now defines a third volume in oil dispensing cylinder 1 equal to the desired volume of oil #3. Valve 39 is opened by solenoid 42 in response to signals from control unit 27 to permit oil from tank 3 to rush into the dispensing cylinder. Valve 39 is then closed by solenoid 42 in response to signals from the control unit 27 and air cylinder 10 is actuated through valve 15 and solenoid 16 to drive the piston rod 3 and piston 2 down to force oil out of inlet valve 5 which has been opened by solenoid 6 in response to signals from the control unit. The oil ejected through outlet 5 is forced into the closed mixer shown in Figure 2 and when the piston 2 reaches the end of its travel, the circuit closes valve 5 through solenoid 6 and a recycle may now take place.

Motor 17 is reversed in response to signals from the control unit thereby rotating screw 19 to return stop nut 46 and arm 22 to the original position.

In one form of the invention, dispensing cylinder 1 would have an 8.156" bore with a 17½" stroke, the cylinder being jacketed for the circulation of fluid for temperature control. Air cylinder 10 is preferably a double acting air cylinder having a 4" bore with a 17" stroke and provided with a four-way solenoid operating valve 15. The metering screw in this modification of the invention has a diameter of 1½" while the actual metering threads extend for 7½" at a rate of 20 threads per inch. Motor 17 may be a ½ H.P., 600 to 1800 r.p.m., 3 phase, 60 cycle, 2-speed motor, for driving metering screw 19 at a low speed and driving the screw in reverse at high speed and return, the metering nut 21 and stop nut 46 rapidly to the "start" position. The action of motor 17 may be cushioned on the return of metering nut 21 to the start position by the use of a friction or torque clutch of conventional design.

Figure 2:
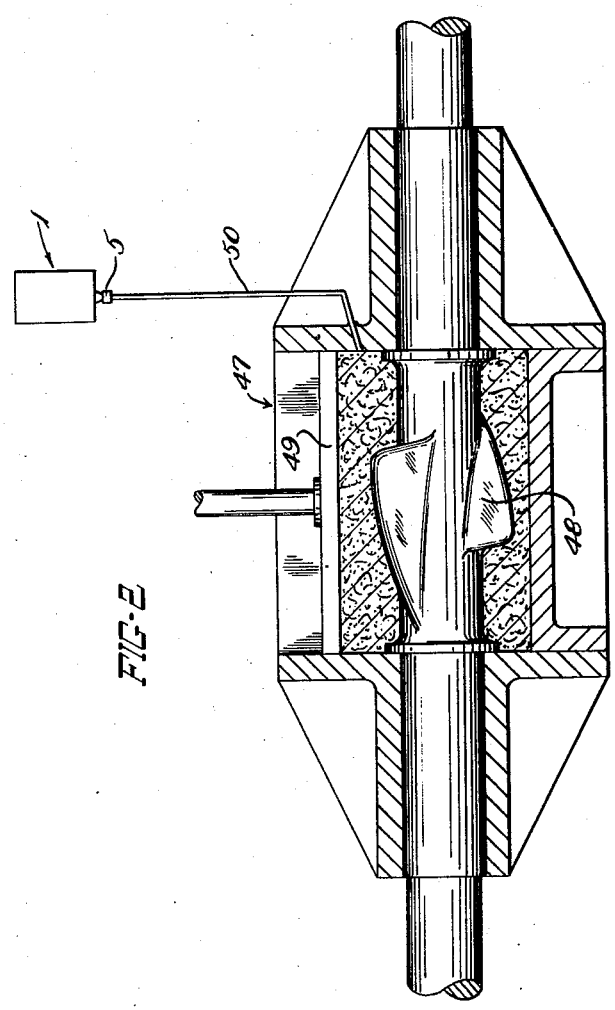
Figure 2 is a sectional view of a closed mixer showing the arrangement of the dispensing unit of the invention.

Referring to Figure 2, a closed Banbury type mixer 47 is provided with mixer rotor 48 and plunger 49 which closes the opening through which the conventional compounding ingredients are added to the mixer. In the preferred form of the invention, an oil inlet 50 is connected to the dispensing valve 5 of the oil dispensing cylinder 1. When the air cylinder 10 drives the piston 2 of the dispensing cylinder 1 to force the mixture of different oils through valve 5, the oils are received in the closed mixer.

Figure 3:
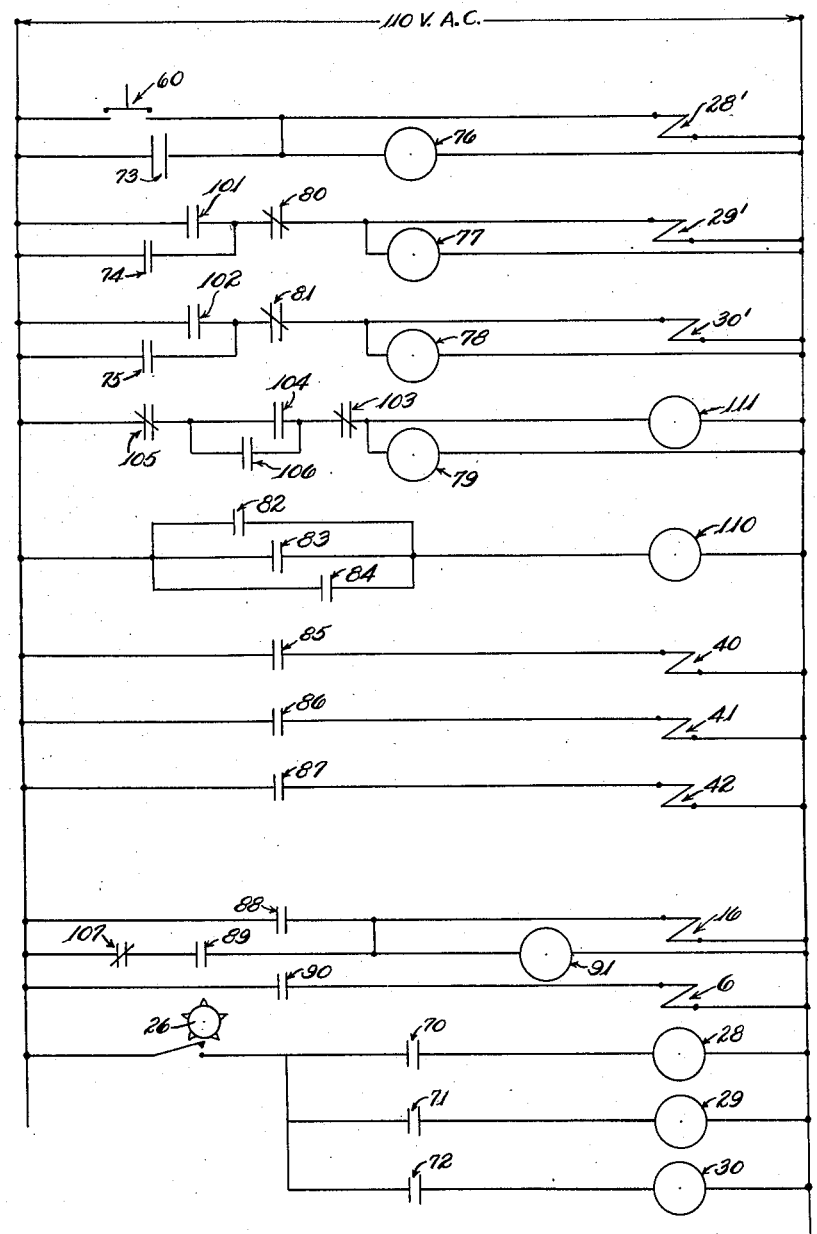
Figure 3 is a diagrammatic outline of the electrical circuit of the invention.

A circuit diagram is shown in Fig. 3. In operation of the circuits of the device the operator pushes the starter button 60 which connects counter coil 28 and relay 76 holding contact 73 closed until all the impulses are into counter 28. Simultaneously, contact 83 starts low speed motor circuit 110 which starts motor 17 which in turn rotates metering screw 19 and cam 26. At the same time the relay contact 85 actuates solenoid 40 to open the valve 37 (Fig. 1) to oil tank 31. Also at this time relay contact 88 actuates solenoid 16 and relay 111 to adjust valve 15 to force high pressure air into the lower part of cylinder 10 while relay contact 70 connects cam 26 to counter coil 28.

Motor 17 continues to run until cam 26 has put out the desired number of impulses which are counted by counter 28 whereupon counter coil 28' opens contact 73 to disconnect counter 28', relay 76 causes relay contact 85 to close valve 37. Oil from tank 1 has rushed into the cylinder 1 as piston 2 is raised by arm 43 of the air cylinder 10.

In the next step in sequence contact 80 closes and one quarter second later relay contact 101 opens actuating relay 77 and counter coil 29 to connect contact 74 into the circuit. Simultaneously contact 82 closes to again start motor 17 while contact 86 closes to actuate solenoid 41 and valve 38 from oil tank 2. Contact 71 connects cam 26 to counter 29. As the motor 17 rotates screw 19 arm 22 is advanced to a new position followed by air cylinder arm 43 while the cam 26 initiates impulses. When the desired number of impulses have been received by counter 29, coil 29' opens contact 74 to disconnect relay 77 and coil 29' and to open contact 86 closing valve 38.

Next step in sequence is initiated as contact 81 now closes and one quarter second later time delay relay 102 opens to actuate coil 30' and relay 78 as contact 75 closes. Simultaneously contact 87 closes to actuate solenoid 42 to open valve 39 from oil tank 3. The contact 72 connects cam 26 into the circuit of counter 30 while contact 84 closes to energize circuit 110 of motor 17 which again slowly rotates screw 19 to advance arm 22 to a third position. Arm 43 follows arm 22 drawing piston 2 of cylinder 1 to a new position to create volume filled by oil from tank 3. Upon completion of the group of impulses passing into counter 30, counter coil 30' opens contact 75 to disconnect relay 78 from the circuit. Contact 87 is opened to actuate solenoid 42 to close valve 39 while contact 84 is open to stop motor 17.

Contact 103 thereupon closes and one quarter second later time delay relay contact 104 opens to actuate relay 111 and 79 whereupon relay contact 106 immediately closes. Relay 111 actuates the reverse circuit of motor 17 to thereby reverse the motor as well as rotation of screw 19 to return arm 22 to its original position. Contact 90 actuates solenoid 6 to open dispensing valve 5. Also, simultaneously relay contact 107 opens relay 91 to actuate solenoid 16 to switch valve 15 allowing air to enter cylinder 10 on the other side of piston 11 through valve 15. Air pressure against the top of the piston drives the piston down to its original position and in so doing drives the piston 2 in cylinder 1 to its initial position thereby dispensing the mixture of three oils through valve 5 into the Banbury. The high speed return circuit of the motor continues to operate until arm 22 contacts a limit switch 105 which disconnects the all circuits which may be activated for another sequence of operation when the operator pushes the start button 60.

Although a preferred form of the invention has been shown by way of example, those skilled in the art will realize that modification is possible within the scope of the following claims.

I claim:

1. A device for accurately measuring the volumes of a number of different liquids comprising a metering screw, means responsive to the rotation of said screw and adapted to initiate electrical pulsations, electrical pulsation sensing means adapted to count said impulses and to activate electrical circuits in timed sequence after a predetermined number of pulsations, a cylindrical sleeve defining a chamber, a piston mounted for reciprocal movement in said chamber, means for reciprocating said piston in said chamber in response to signals carried by said circuits, fluid inlet ports and a fluid outlet port in the walls of said sleeve, fluid supply means including at least two reservoirs having pipes connected to said fluid inlet ports, valves adapted for control of the flow of fluid through said pipes in response to electrical signals from said sensing means, stop means responsive to the rotation of said screw and adapted to limit the travel of said piston, and means responsive to said sensing means adapted to drive said screw whereby said stop means moves in sequence predetermined distances along said screw to define with said piston the desired volume of liquid inserted in said chamber.

2. A device for accurately measuring mixtures of fluids into a container comprising a cylinder having walls defining a chamber, a piston adapted to reciprocate in said chamber, a metering screw, a reversible motor adapted to drive said metering screw, a distributor mounted on the end of said screw and adapted to emit electrical impulses in response to the rotation of the screw, impulse counters responsive to the output of said distributor and adapted to be preset for predetermined impulse valves proportional to the volume of each fluid to be measured, an electric controller having circuits responsive to said counters, inlet ports and an outlet port in said cylinder, fluid reservoirs connected to said inlets by pipes, valves in said pipes responsive to said controller, a valve on said outlet port responsive to said controller, an air cylinder adapted to reciprocate said piston in response to said controller, and a stop nut on said metering screw adapted to limit the travel of said piston whereby predetermined volumes are defined by said piston in sequence in said chamber.

3. A method of ejecting an exact volume made up of a mixture of smaller exact volumes of different fluids from a container having a variable capacity comprising the steps of initiating a series of groups of electrical impulses in an electrical circuit, circulating electrical energy in a second electrical circuit in response to the termination of one said group of impulses to open a solenoid valve to allow liquid to flow through a conduit from a reservoir into said container, terminating the flow of electrical energy in said second circuit upon termination of another group of said impulses to close the solenoid and stop the flow of fluid, circulating electrical energy in a third circuit in response to the termination of yet another group of said impulses and in response thereto changing the volume of said container to a larger exact volume, circulating electrical energy in a fourth circuit in response to the termination of yet another group of impulses to open a solenoid valve to allow a second fluid to flow through a conduit from a second reservoir into said container, terminating the flow of electrical energy in said fourth circuit upon termination of another group of impulses to close the solenoid and stop the flow of said second fluid, circulating electrical energy in a fifth circuit in response to the termination of yet another group of impulses and in response thereto decreasing the volume of said container to zero to eject therefrom the enclosed volume of the mixture of fluids.

4. A method of ejecting an exact volume of fluid from a container having variable capacity comprising the steps of initiating a series of groups of electrical impulses in an electrical circuit, circulating electrical energy in a second circuit in response to the termination of a group of said impulses and in response thereto adjusting the volume of said container to an exact volume, circulating electrical energy in a third circuit in response to the termination of another group of impulses to open a solenoid valve to allow fluid to flow through a conduit from a reservoir into said container, terminating the flow of electrical energy in said third circuit upon termination of another group of impulses to close the solenoid and stop the flow of said fluid, circulating electrical energy in a fourth circuit in response to the termination of yet another group of said impulses and in response thereto decreasing the volume of said container to zero to eject therefrom the enclosed volume of fluid.

5. A device for introducing an exact volume of a fluid into an adjustable container having a variable capacity comprising an electrical circuit, means for initiating a series of electrical impulses of definite number in said circuit, means responsive to the termination of said series of impulses for setting said container to a predetermined volume proportionately related to said number of impulses and means also responsive to the termination of said series of impulses for introducing sufficient fluid into said container to fill said predetermined volume.

6. A device for introducing an exact volume of fluid from at least two different fluid sources into an adjustable container having a variable capacity, comprising an electrical circuit, means for sequentially initiating at least two groups of definite numbers of electrical impulses in said circuit, means responsive to the termination of each group of said series of impulses for setting said container sequentially to a predetermined volume proportionately related to number of impulses in each respective group, and means also responsive to the termination of each group of series of impulses for sequentially introducing a sufficient volume of each fluid into said container to fill said predetermined volume.

References Cited in the file of this patent

UNITED STATES PATENTS

| | | |
|---|---|---|
| 1,519,568 | Amstel | Dec. 16, 1924 |
| 1,578,517 | Hein | Mar. 30, 1926 |
| 1,607,899 | Long | Nov. 23, 1926 |
| 1,714,447 | Rockwell | May 21, 1929 |
| 1,848,176 | Jernberg | Mar. 8, 1932 |
| 1,932,976 | Lamb et al. | Oct. 31, 1933 |
| 2,118,704 | Grontkowski | May 24, 1938 |
| 2,315,920 | Baker et al. | Apr. 6, 1943 |
| 2,348,149 | Reinhardt et al. | May 2, 1944 |
| 2,736,466 | Rodth | Feb. 28, 1956 |
| 2,769,573 | Miller | Nov. 6, 1956 |
| 2,774,364 | Brobeil | Dec. 18, 1958 |